United States Patent Office 3,755,426
Patented Aug. 28, 1973

3,755,426
10-HALOPROSTAGLANDIN-A DERIVATIVES
Donald P. Strike, Rosemont, and Herchel Smith, Bryn Mawr, Pa., assignors to American Home Products Corporation, New York, N.Y.
No Drawing. Filed July 2, 1971, Ser. No. 159,557
Int. Cl. C07c 61/36, 69/74
U.S. Cl. 260—514 D                3 Claims

ABSTRACT OF THE DISCLOSURE 10-halo derivatives of prostaglandin-A compounds are prepared by epoxidation followed by treatment with hydrohalic acid. The compounds thus obtained have potent bronchodilator activity.

BACKGROUND OF THE INVENTION

This invention relates to compositions of matter classified in the art of chemistry as prostanoic acid derivatives, specifically 10-halo-prostaglandin-A compounds having potent bronchodilating activity in warm-blooded animals.

Prostaglandin A compounds (PGA compounds) unsubstituted by halogen are known naturally occurring substances, and are disclosed, for example, in South African Patent 66/3600. These compounds have the structure.

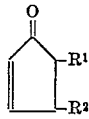

wherein $R^1$ is a heptanoic acid residue which may have a double bond in the 5-position, and $R^2$ is a 3-hydroxyoctane residue which may have a double bond in the 1-position, or double bonds in both the 1 and 5 positions. The known PGA compounds are stated in the art to exert various pharmacological effects in warm-blooded animals, including the ability to lower blood pressure, normalize serum lipids, and alleviate central nervous system disorders. There is no indication in the art that the naturally occurring PGA compounds possess bronchodilating activity.

SUMMARY OF THE INVENTION

The invention sought to be patented in its composition aspect resides in the concept of a chemical compound of the structure

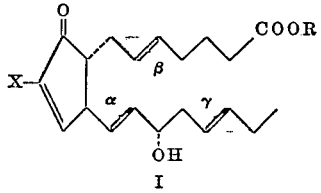

I wherein (A) $\alpha, \beta$ and $\gamma$ are single bonds;
(B) $\alpha$ is a trans-double bond and $\beta$ and $\gamma$ are single bonds;
(C) $\alpha$ is a trans-double bond, $\beta$ is a cis-double bond, and $\gamma$ is a single bond; or
(D) $\alpha$ is a trans-double bond and $\beta$ and $\gamma$ are cis-double bonds;
X is chlorine or bromine; and
R is hydrogen, alkyl of from 1 to about 6 carbon atoms, alkali metal, or a pharmacologically-acceptable cation derived from ammonia or a basic amine.

The tangible embodiments of the composition aspect of the invention possess the inherent general physical properties of being pale yellow gums or oils, are substantially insoluble in water, and are generally soluble in organic solvents, such as, for example, alcohols, benzene, hydrocarbons, etc. Examination of the compounds produced according to the hereinafter described process reveals, upon infrared, ultraviolet and nuclear magnetic resonance spectrographic analysis, spectral data supporting the molecular structure hereinbefore set forth. The aforementioned physical charcateristics, taken together with the nature of the starting materials and the elemental analysis of the products obtained therefrom, further confirm the molecular structure hereinbefore set forth.

The tangible embodiments of the composition aspect of the invention possess the applied use characteristic of exerting bronchodilating and hypotensive effects in animals as evidenced by pharmacological evaluation according to standard test procedures.

The invention sought to be patented in its process aspect resides in the concept of a process for producing bronchodilation in warm-blooded animals which comprises administering to a warm-blooded animal in need thereof an effective amount of a compound of the formula

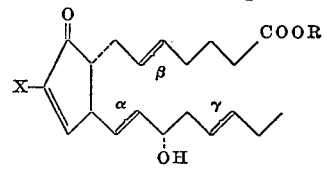

wherein (A) $\alpha$, $\beta$ and $\gamma$ are single bonds;
(B) $\alpha$ is a trans-double bond and $\beta$ and $\gamma$ are single bonds,
(C) $\alpha$ is a trans-double bond,
$\beta$ is a cis-double bond, and
$\gamma$ is a single bond; or
(D) $\alpha$ is a trans-double bond, and
$\beta$ and $\gamma$ are cis-double bonds;
X is chlorine or bromide; and
R is hydrogen, alkyl of from 1 to about 6 carbon atoms, alkali metal, or a pharmacologically-acceptable cation derived from ammonia or a basic amine.

DESCRIPTION OF THE PREFERRED EMBODIMENTS

The tangible embodiments of the composition aspect of the invention may be prepared according to the following reaction sequence illustrating the preparation of a specific embodiment thereof:

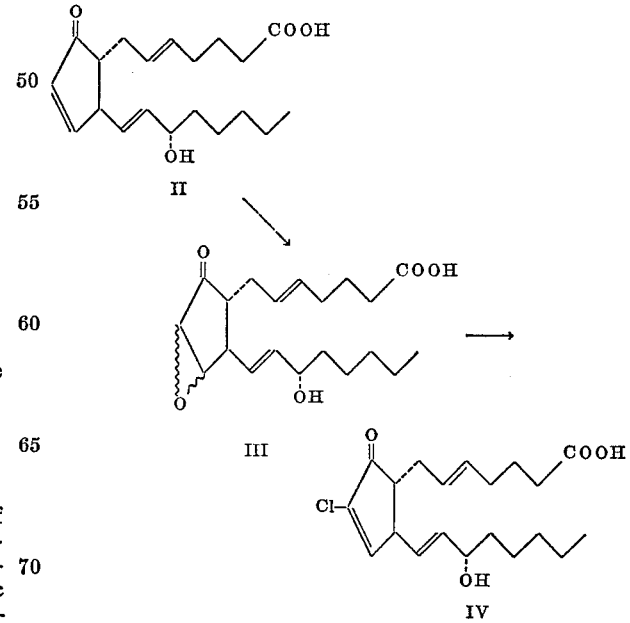

Compound II, 7-[2-(3-hydroxy-1-octenyl)-5-oxo-3-cyclopenten-1-yl]-5-heptenoic acid is a naturally occurring substance also known as PGA$_2$. It may thus be obtained from natural sources, or may be prepared synthetically as described for example in South African Patent 66/3600. Treatment of II, with hydrogen peroxide in the presence of inorganic base, followed by acidification with a weak acid, such as acetic acid, affords III, 7-[2-(3-hydroxy-1-octenyl) - 4 - oxo - 6 - oxabicyclo[3.1.0]hex-3-yl]-5-heptenoic acid. In this process step, II is conveniently treated with hydrogen peroxide in a water-alcohol system (e.g., water/methanol) at 0°. After reaction, which should be complete in about ½ hour, the reaction mixture is conveniently diluted with water prior to acidification. The intermediate product III may then be isolated by extraction with a solvent, such as diethyl ether, followed by washing, drying, and evaporation of the solvent. III is then dissolved in an organic solvent having at least slight water solubility, such as acetone, dioxan, or tetrahydrofuran, and is treated with a small amount of aqueous mineral acid, such as hydrochloric acid. After stirring at room temperature for about ½ hour, the reaction mixture is diluted with water and extracted with an organic solvent, such as diethyl ether. The solvent is then evaporated from the extract, and the residue is chromatographed on silica using a solvent system such as hexane: ethyl acetate (1:1) to obtain IV, 7-[2-(3-hydroxy-1-octenyl) - 4 - chloro - 5-oxo-3-cyclopenten-1-yl]-5-heptenoic acid.

It will be obvious to those skilled in the art that as starting materials in the production of the compounds of the invention one may employ substances which bear substituent groups readily converted to those groups desired in the final product. Thus, for example, in an alternate procedure, 7-[2-(3-hydroxyoctyl)-4-chloro-5-oxo-3-cyclopenten-1-yl]heptanoic acid may be prepared by treating 4-oxo-2-[3-(tetrahydropyran-2-yloxy)octyl-6-oxobicyclo[3.1.0]hexane-3-heptanoic acid with hydrochloric acid, in a solvent such as acetone. Under the conditions of the reaction, the tetrahydropyranyloxy group at position-3 of the octyl moiety is simultaneously hydrolyzed to the desired hydroxy substituent. The starting material in this process variant may be prepared as described in our pending U.S. Pat. application Ser. No. 134,465 filed Apr. 16, 1971.

While the process for the preparation of the tangible embodiments of the composition aspect of the invention has been described by reference to a specific embodiment thereof, the process is applicable to the preparation of all of the embodiments described and claimed. The free carboxylic acid starting materials for the preparation of all of the embodiments may be obtained from natural sources, by means described in the art, or may be prepared as described in the above-mentioned South African Pat. 66/3600. By means of the above-described process they are converted to compounds of Formula I in which R is hydrogen. Substitution of hydrobromic acid for hydrochloric acid in the second reaction step of the process affords those embodiments of the invention wherein X is bromine. Those embodiments of the invention wherein R is alkyl, alkali metal, or a cation derived from ammonia or a basic amine may be prepared from the corresponding embodiments wherein R is hydrogen by conventional techniques known to those skilled in the art, as will be illustrated below.

The term "alkyl of from about 1 to about 6 carbon atoms" when used herein and in the claims includes straight and branched chain hydrocarbon radicals, illustrative members of which are methyl, ethyl, n-propyl, i-propyl, n-butyl, t-butyl, n-pentyl, n-hexyl, 3-methylpentyl, 2,3-dimethylbutyl, and the like. "Alkali metal" includes, for example, sodium, potassium, lithium, and the like. A "pharmacologically-acceptable cation derived from ammonia or a basic amine" contemplates the positively charged ammonium ion and analogous ions derived from organic nitrogenous bases strong enough to form such cations. Bases useful for the purpose of forming pharmacologically-acceptable non-toxic addition salts of such compounds containing free carboxyl groups form a class whose limits are readily understood by those skilled in the art. Merely for illustration, they can be said to comprise, in cationic form, those of the formula:

wherein R$^1$, R$^2$, and R$^3$, independently, are hydrogen, alkyl of from about 3 to about 6 carbon atoms, monocaralkyl of from about 1 to about 6 carbon atoms, cycloalkyl of from about 3 to about 6 carbon atoms, monocarbocyclicaryl of about 6 carbon atoms, monocarbocyclicarylalkyl of about 7 to about 11 carbon atoms, hydroxyalkyl of from about 1 to about 3 carbon atoms, or monocarbocyclicarylhydroxyalkyl of from about 7 to about 15 carbon atoms or, when taken together with the nitrogen atom to which they are attached, any two of R$^1$, R$^2$, and R$^3$ form part of a 5 to 6-membered heterocyclic ring containing carbon, hydrogen, oxygen, or nitrogen, said heterocyclic rings and said monocarbocyclicaryl groups being unsubstituted or mono- or dialkyl substituted, said alkyl groups containing from about 1 to about 6 carbon atoms. Illustrative therefore of R groups comprising pharmacologically-acceptable cations derived from ammonia or a basic amine are ammonium, mono-, di-, and trimethylammonium, mono-, di- and triethylammonium, mono-, di-, and tripropylammonium (iso and normal), ethyldimethylammonium, benzyldimethylammonium, cyclohexylammonium, benzylammonium, dibenzylammonium, piperidinium, morpholinium, pyrrolidinium, piperazinium, 1-methylpiperidinium, 4-ethylmorpholinium, 1-isopropylpyrrolidinium, 1,4-dimethylpiperazinium, 1-n-butylpiperidinium, 2-methylpiperidinium, 1-ethyl-2-methylpiperidinium,, mono-, di- and triethanolammonium, ethyldiethanolammonium, n-butylmonoethanolammonium, tris (hydroxymethyl) methylammonium, phenylmonoethanolammonium, and the like.

Those compounds of Formula I wherein R is alkyl are prepared by standard methods, such as for example by treating a solution of the free acids with diazomethane or other appropriate diazohydrocarbons, such as diazoethane, 1-diazo-2-ethylpentane, and the like. The embodiments of the invention wherein R is an alkali metal can be prepared by mixing stoichiometrically equivalent amounts of the embodiments wherein R is hydrogen with solutions of alkali metal bases, such as sodium, potassium, and lithium hydroxides or carbonates, and the like, then freeze drying the mixture to leave the product as a residue. The amine salts are prepared by mixing the embodiments wherein R is hydrogen, preferably in solution, with a solution of the appropriate amine, in water, isopropanol, or the like, and freeze drying the mixture to afford the product as a residue.

Bronchodilator agents are substances able to relax the smooth muscles of the bronchial tree and thus control spasm, resulting from both endogenous and exogenous causes, and facilitate breathing.

The bronchodilator activity of the compounds of the invention may be readily demonstrated in standard pharmacological test procedures. In a particularly suitable procedure, the bronchodilator activity of the compounds of the invention is demonstrated by the ability of the compounds upon intravenous administration to counteract the broncho-constricting effects of acetyl-choline in anesthetized guinea pigs. This procedure is described in Rosenthale, M.E., and Dervinis, A.: Arch. Int. Pharmacodyn. 172: 91, 1968.

In addition to administration by the intravenous route, in the practice of the process aspect of the invention, administration by the oral and inhalation routes is also contemplated. The preparation of dosage forms suitable for use in administration by the particular route chosen will be readily apparent to those skilled in the art of pharmacology. For example, the active ingredient can be compounded into any of the usual oral dosage forms including tablets, capsules and liquid preparations such as elixirs and suspensions containing various coloring, flavoring, stabilizing and flavor masking substances. For compounding oral dosage forms the active ingredient can be diluted with various tableting materials such as starches of various types, calcium carbonate, lactose, sucrose and dicalcium phosphate to simplify the tableting and capsulating process. A minor proportion of magnesium stearate is useful as a lubricant. In all cases, of course, the proportion of the active ingredient in said composition will be sufficient to impart bronchodilating activity thereto. This will range upward from about 0.0001% by weight of active ingredient in said composition.

For administration by the oral inhalation route with conventional nebulizers or by oxygen aerosolization it is convenient to provide the instant active ingredient in dilute aqueous solution, preferably at concentrations of about 1 part of medicament to from about 100 to 200 parts by weight of total solution. Entirely conventional additives may be employed to stabilize these solutions or to provide isotonic media, for example, sodium chloride, sodium citrate, citric acid, sodium bisulfite, and the like can be employed.

For administration as a self-propelled dosage unit for administering the active ingredient in aerosol form suitable for inhalation therapy the composition can comprise the active ingredient suspended in an inert propellant (such as a mixture of dichlorodifluoromethane and dichlorotetrafluoroethane) together with a co-solvent, such as ethanol, flavoring materials and stabilizers. Instead of a co-solvent there can also be used a dispersing agent such as oleyl alcohol.

The particular dose required to elicit a bronchodilator response will vary depending upon the particular animal being treated, the particular spasmodic or bronchoconstrictive condition being counteracted, the severity of the condition, and the route of administration. In the guinea pig, for example, the intravenous administration of 7-[2-(3-hydroxyoctyl) - 4 - chloro - 5 - oxo - 3 - cyclopenten-1-yl]heptanoic acid, at a dose rate of 10 micrograms per kilogram inhibited by 52% the bronchoconstriction caused by acetylcholine administered at 25 micrograms per kilogram. Preferably, in eliciting the bronchodilator response one should initially administer the compounds of the invention in low dose, then increase the dose in subsequent administrations until the desired effect is obtained. An initial dose rate of 5 to 10 micrograms per kilogram is recommended.

In their applied use characteristic of exerting a hypotensive effect in warm-blooded animals, the tangible embodiments of the compositions of the invention are preferably administered by the intraveous route. Significant decrease in blood pressure in hypotensive rats can be observed at an intravenous dose rate of about 100 to 500 μg./kg. body weight.

The following examples illustrate the preparation of specific embodiments of the composition aspect of the invention. These examples are for purposes of illustration only and are not limitative in any manner.

EXAMPLE 1

7-[2-(3-hydroxy-1-octenyl)-4-oxo-6-oxabicyclo [3.1.0]hex-3-yl]-5-heptenoic acid

Cool a solution of 1.9 g. of 7-[2-(3-hydroxy-1-octenyl)-5-oxo-3-cyclopenten-1-yl]-5-heptenoic acid and 6.0 ml. of 30% hydrogen peroxide in 60 ml. of methanol and 6.0 ml. of water to 0° and treat with 6.6 ml. of 1 N sodium hydroxide. Stir the mixture at 0° for ½ hour, dilute with water, acidify with acetic acid and extract with ether. Wash, dry and evaporate the ether extract to obtain the title product.

EXAMPLE 2

7-[2-(3-hydroxy-1-octenyl)-4-chloro-5-oxo-3-cyclopenten-1-yl]-5-heptenoic acid

Treat a solution of 0.5 g. of 7-[2-(3-hydroxy-1-octenyl) - 4-oxo-6-oxabicyclo[3.1.0]hex-3-yl)-5-heptenoic acid in 10 ml. of acetone with 1.0 ml. of hydrochloric acid and stir the mixture at 25° for 0.5 hour. Dilute the mixture with water, extract with ether and wash and dry the ether extract. Evaporate the ether and chromatograph the residue on silica to obtain the title product.

EXAMPLE 3

7-[2-(3-hydroxyoctyl)-4-chloro-5-oxo-3-cyclopenten-1-yl]-heptanoic acid

Treat a solution of 0.52 g. of 4-oxo-2-[3-(tetrahydropyran-2-yloxy)octyl]-6-oxa bicyclo[3.1.0]hexane-3-heptonoic acid in 10 ml. of acetone with 1.0 ml. of hydrochloric acid and stir the mixture at 25° for 0.5 hour. Dilute the mixture with water, extract with ether and wash and dry the ether extract. Evaporate the solvent and chromatograph the residue on silica to obtain 0.1 g. of the title product.

The subject matter which applicants regard as their invention is particularly pointed out and distinctly claimed as follows:

1. A compound of the structure

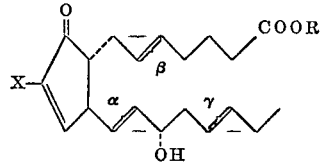

wherein (A) α, β and γ are single bonds;
(B) α is a trans-double bond and β and γ are single bonds;
(C) α is a trans-double bond, β is a cis-double bond, and γ is a single bond; or
(D) α is a trans-double bond and β and γ are cis-double bonds;

X is chlorine or bromine; and

R is hydrogen, alkyl of from 1 to about 6 carbon atoms, alkali metal, or a pharmacologically-acceptable cation derived from ammonia or a basic amine.

2. The compound according to claim 1, 7-[2-(3-hydroxyoctyl) - 4 - chloro - 5-oxo-3-cyclopenten-1-yl]-heptanoic acid.

3. The compound according to claim 1, 7-[2-(3-hydroxy - 1 - octenyl)-4-chloro-5-oxo-3-cyclopenten-1-yl]-5-heptenoic acid.

References Cited

Corey et al., JACS 92, 397, 1970.

LORRAINE A. WEINBERGER, Primary Examiner

R. GERSTL, Assistant Examiner

U.S. Cl. X.R.

260—247.2 R, 268 R, 268 MK, 293.65, 326.3, 348 A, 468 D, 501.1, 501.17; 124—305, 317